(12) United States Patent
Neubeck

(10) Patent No.: US 8,856,138 B1
(45) Date of Patent: Oct. 7, 2014

(54) FASTER SUBSTRING SEARCHING USING HYBRID RANGE QUERY DATA STRUCTURES

(75) Inventor: Alexander Neubeck, Obermichelbach (DE)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 13/570,761

(22) Filed: Aug. 9, 2012

(51) Int. Cl.
*G06F 7/00* (2006.01)
*G06F 17/30* (2006.01)

(52) U.S. Cl.
CPC .............................. *G06F 17/30327* (2013.01)
USPC ......................................................... 707/745

(58) Field of Classification Search
CPC ................................................ G06F 17/30324
USPC ......................................................... 707/745
See application file for complete search history.

(56) References Cited

U.S. PATENT DOCUMENTS

| | | | | |
|---|---|---|---|---|
| 6,188,797 | B1* | 2/2001 | Moledina et al. | 382/246 |
| 7,120,637 | B2* | 10/2006 | Bailey | 707/797 |
| 8,180,763 | B2* | 5/2012 | Freedman et al. | 707/713 |
| 8,356,021 | B2* | 1/2013 | Williams | 707/696 |
| 2004/0062208 | A1* | 4/2004 | Brown et al. | 370/256 |
| 2007/0112795 | A1* | 5/2007 | Travison et al. | 707/100 |
| 2010/0281013 | A1* | 11/2010 | Graefe | 707/715 |
| 2012/0119927 | A1* | 5/2012 | Zhang et al. | 341/79 |

OTHER PUBLICATIONS

Pagh et al. Secondary indexing in one dimension: beyond B-trees and bitmap indexes. 2009. In PODS. pp. 177-186.*
Grishenko et al. Binmaps: hybridizing bitmaps and binary trees. 2009. PDS Technical Report PDS-2011-001.*
Maekinen, et al, "Position-Restricted Substring Searching", Latin 2006: Theoretical Informatics, 2006, pp. 703-714.
Maekinen, V., Navarro, G.: Position-restricted substring searching. In Correa, J.R., Hevia, A., Kiwi, M.A., eds.: Latin. vol. 3887 of Lecture Notes in Computer Science., Springer (2006), pp. 703-714.
Maekinen, et al, "Rank and Select Revisited and Extended", retrieved from http://www.dcc.uchile.cl/~gnavarro/ps/tcs06.2.pdf, Aug. 17, 2007, 28 pages.
Gonzalez, et al "Practical Implementations of Rank and Select Queries", retrieved from http://personales.dcc.uchile.cl/~gnavarro/ps/wea05.pdf, Poster Proceedings Volume of 4th Workshop on Efficient and Experimental Algorithms (WEA'05), 2005, 11 pages.

* cited by examiner

*Primary Examiner* — James E Richardson
(74) *Attorney, Agent, or Firm* — Brake Hughes Bellermann LLP

(57) ABSTRACT

A system is disclosed for faster processing of range queries. The system includes at least one processor and a memory storing a hybrid range query data structure in the form of a binary tree. The structure includes a root node, non-leaf nodes, and leaf nodes. The root node is a bitmap that includes one bit for each value in a first set of values. The non-leaf nodes are also bitmaps. The leaf nodes eliminate a number of lower levels of the tree and include two or more second values that map to values in the first set of values. The system may include instructions that cause the system to receive a range of first values, use the range of first values to traverse the data structure to identify second values that map to the first values, and return the identified second values in sorted order.

20 Claims, 6 Drawing Sheets

```
// Calculate the number of sections that make up the temporary bitmap.
// The sections match the cache size (word size) to make the sort cache-friendly
//  and increase speed.
// k is the number of levels eliminated.
const int words = 2k / 64;

// Create the temporary bitmap
uint64 word[words];

// Initialize the temporary bitmap to all zeros
memset (word, 0, sizeof (word));

// Set the corresponding mapped values in the segments of the bitmap.
// node[x] = the value at the xth position in the leaf node.
// i=the position of the first marked bit; i'=the position of the last marked bit in the leaf node
for (int x=i ; x <= i' ; x++)
        word[ node[x]/64 ] |= 1<<(x%64);

// extract the marked bits in ascending order
int section_offset = 0;
// for each section in the temporary bitmap
for (int x=0 ; x < words ; x++) {
        uint64 w = word[x];
        // while there are still bits in this section that have not been reported
        // popcount is a function returning the number of ones in a string of bits.
        while (w) {
                // report the bit position of the least significant bit
                report ( popcount ( w XOR (w-1) - 1) + section_offset);
                // get rid of the marked bit just reported by changing it to a zero
                w = w AND (w-1);
        }
        // increase the offset to the next section
        section_offset += 64;
}
```

FIG. 6

FASTER SUBSTRING SEARCHING USING HYBRID RANGE QUERY DATA STRUCTURES

TECHNICAL FIELD

This description relates to range query processing and, more specifically, to systems and methods for improving the response time of a range query.

BACKGROUND

Search engines assist users in locating information from documents, including, for example, web pages, PDFs, word processing documents, source code, text files, images, etc. When searching a large corpus of documents, such as the documents available on the Internet, a search engine may use a range query data structure for efficient substring/phrase searching. A range query data structure is used to represent general integer-to-integer mappings (e.g., a map[i] function) with only slightly more memory usage than a straightforward representation of an array, but the range query data structure dramatically reduces the theoretical complexity of range queries (e.g., enumerate all integers of the set $j_0 <= \text{map}[i] <= j_1$, where $i_0 <= i <= i_1$). In document searching, the range query data structure enables the use of suffix arrays. Suffix arrays store document strings, including partial strings, that look similar at neighboring places in the array. For example, if a document contains the words "prevent," "inventions," "venture," and "intervention," these four occurrences of the word stem "vent" will appear in neighboring entries in the suffix array (e.g., as entries of "vent", "vention,", "ventions," and "venture"). This is an efficient way to query the contents of documents. However, for document searching and ranking, it is important to know the position of each string within the document (e.g., where in the document the strings occur in the document). The range query data structure provides this answer by mapping the positions of the suffix array (the i values) to document positions (the j values) in order of appearance within the document.

Some range query data structures use a bitmap binary tree structure for the mapping. The leaves of the tree are the document positions in sorted order (the j values). The nodes of the tree indicate the path to the correct leaf node, with the values in the root node mapping directly to the suffix array positions (the i values). FIG. 2 shows an example of such a tree. The map[i] function 200 takes in a value i from 0 to n (in this example n=15 and may represent an index for a suffix array) and returns an integer j representing the position in the document for the value stored at i. For example, if the suffix entry "vent" is stored in the first suffix array position, represented by an index of zero, the map[i] function 200 indicates that the "vent" string occurs at index 14 in the document. The map[i] function 200 shown in FIG. 2 is not generally stored in memory, but is shown as an example of what the map[i] function is expected to return given a certain input. In the example of FIG. 2, given an index value of six for i the map function should return a j value of one, and given the $3^{rd}$ position of the suffix array, the map function should return a j value of eight, etc.

Range query structures are used because they reduce the amount of time needed to locate large intervals. For example, in a brute-force lookup (without using the query structure), the time to collect all mapped values into an array is O(m) and the time to sort the array is O(m*log(m)), where m is the size of the range being mapped. Conversely, a range query data structure takes O(m*(2+log(n)−(log(m)))), where n is the size of the array and following a single entry to a leaf has a log(n) overhead. When m is large (e.g., m=n), the range query easily outperforms the brute-force method. But not so for smaller intervals because the logarithmic overhead is larger than the savings. Most of the processing time spent in a range query occurs in the lower levels of the binary tree, and as the size of the binary tree grows the number of cache misses (caused by random memory accesses) increases. These cache misses can degrade the performance of the tree, especially for large trees, such as a tree with hundreds of millions of leaf nodes. Furthermore, for some queries (e.g., text searches), the range of values to be mapped is small (e.g., tens or hundreds) compared to the range spanned by the corresponding nodes in the binary tree (e.g., hundreds of millions), making the use of the range query data structure costly for the small range.

SUMMARY

One aspect of the disclosure can be embodied in a computer-implemented method that includes creating, by a processor, a hybrid range query data structure, the data structure representing a binary tree used to map a first set of values to a second set of values. The method may also include replacing a number of lower levels of the data structure with leaf nodes storing the second set of values and storing the data structure binary tree in a memory. In some implementations the method may also include receiving a range of first values from the first set of values, using the range of first values to traverse the data structure in an depth-first traversal to identify second values from the second set of values that map to the first values, and returning the second values in sorted order. Returning the second values in sorted order may include arriving at a particular leaf node of the leaf nodes, the particular leaf node containing at least some second values, the at least some second values mapping to at least some of the first values, marking bits in a bitmap corresponding to the at least some second values in the particular leaf node, and reporting a position of the marked bits. In some implementations, as part of reporting the position of the marked bits, a node offset may be added to the reported position.

These and other aspects can include one or more of the following features. For example, the data strcture may be divided into sections that match a word size or the number of lower levels replaced may be eight. In some implementations, the first set of values may be positions in a suffix array and the second set of values may represent positions within a document.

Another aspect of the disclosure can be a system for processing range queries that includes one or more processors and a memory storing a hybrid range query data structure and storing instructions that, when executed by the processor, cause the processor to create and use the data structure. The hybrid range query data structure may comprise a root node of a binary tree, non-leaf nodes of the binary tree, and leaf-nodes of the binary tree. The root node may include a bitmap that includes one bit for each value in a set of first values. Each non-leaf node may have a parent node and one or two child nodes and may include a bitmap, wherein the number of bits in the bitmaps of non-leaf nodes sharing a particular parent node are equal the number of bits in the bitmap of the particular parent node. The leaf nodes eliminate a number of lower levels of the binary tree, each leaf node having a non-leaf parent node, and each leaf node including two or more second values, each of the second values mapping to one value in the first set of values. The number of second values in leaf nodes sharing a particular non-leaf parent node may equal the number of bits in the bitmap of the particular non-leaf parent node. In some implementations, the number of second values in each leaf node may be based on the number of lower levels eliminated. In some implementations the second values of each leaf node may be added to a node offset to obtain actual values for the second values. In certain implementations, each second value may be stored in a number of bits, the number of bits being equal to the number of lower levels eliminated.

These and other aspects can include one or more of the following features. For example, the instructions may cause the system to perform operations that include receiving a range of first values from the first set of values, identifying second values that map to the first values by using the range of first values to traverse the binary tree in an depth-first traversal, and returning the identified second values in sorted order. Returning the identified second values in sorted order may include arriving at a particular leaf node of the leaf nodes, the particular leaf node containing at least some identified second values, marking bits in a bitmap corresponding to the at least some identified second values in the particular leaf node, and reporting a position of the marked bits. In some implementations, the marked bits are reported from least significant bit to most significant bit. In certain implementations, as part of reporting the position of the marked bits, the instructions may further cause the system to add a node offset to the reported position. In some implementations, the bitmap may be divided into sections that match a word size.

Another aspect of the disclosure can be a computer-readable storage device for creating and using a hybrid range query data structure, the storage device having recorded and embodied thereon instructions that, when executed by one or more processors of a computer system, cause the computer system to perform operations. The operations may include creating the hybrid range query data structure, the data structure representing a binary tree used to map a first set of values to a second set of values. The operations may also include replacing a number of lower levels of the data structure with leaf nodes storing the second set of values and storing the data structure in a memory of the computer system.

The details of one or more implementations are set forth in the accompanying drawings and the description below. Other features will be apparent from the description and drawings, and from the claims.

BRIEF DESCRIPTION OF DRAWINGS

FIG. 6 illustrates an example of pseudo-code used to implement the reporting of marked mapped values in sorted order in implementations where the number of layers eliminated is 6 or more.

Like reference symbols in the various drawings indicate like elements.

DETAILED DESCRIPTION

Systems and methods consistent with disclosed implementations present a hybrid range query data structure that eliminates the lower levels of the binary tree with a brute-force lookup table. Using the hybrid range query data structure can eliminate several recursive calls in traversing the tree, improving the lookup time. For example, when eight levels are eliminated, lookup time may be improved by a factor of 10, depending on the hardware and the size of the original document. But, because the tree has been cut, the values obtained from the leaves in the hybrid tree (e.g., the j values) will no longer be in ascending order. Accordingly, the systems and methods consistent with disclosed implementations also involve sorting the identified mapped values in an efficient manner, so that the lookup time does not suffer. Moreover, as the range of values in the range query increases, the search performance savings of the hybrid tree also increases, rather than decreases (as with brute-force methods). For example, the time to locate a range using the hybrid range query data structure may be represented by $O(m*(2+\max((\log(n)-\log(m)-k, 0))$, where k is the number of levels eliminated from the range query data structure.

In particular, the hybrid range query data structure allows a query processor to short-cut the last layers of the binary tree, which is where most of the time of a range query is spent. Disclosed implementations include systems and methods for building the proposed data structure, traversing the data structure, and reporting the mapped values of the leaves so that the results remain in ascending order.

Figure 2:
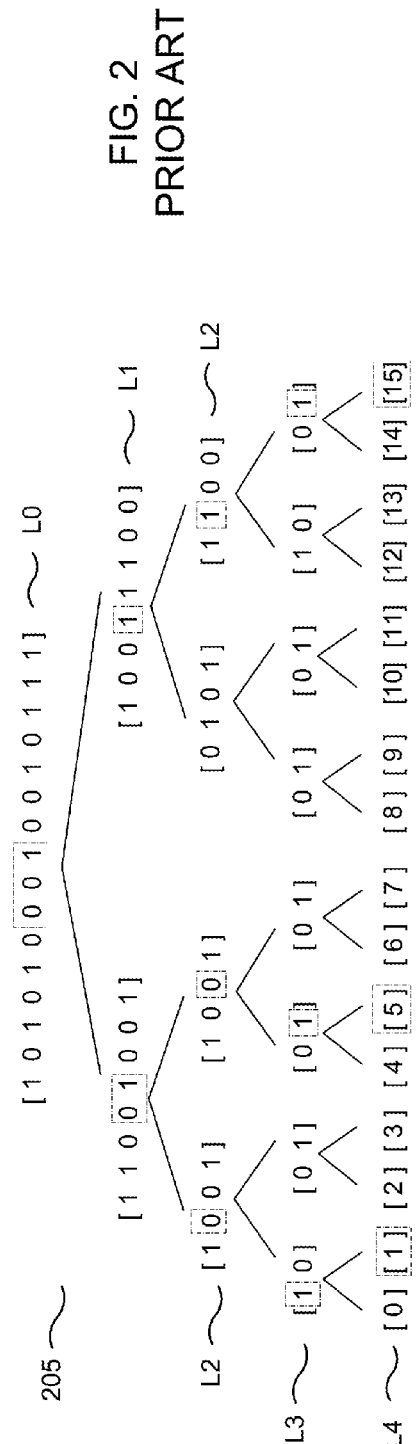
FIG. 2 illustrates a binary tree for a range query data structure.

A range query data structure includes a bitmap binary tree, where only the leaves contain values. An explanation of how a range query data structure operates follows using the tree of FIG. 2. As mentioned above, FIG. 2 illustrates a traditional range query data structure used to find ranges such as, for example, words in a document or sequences of DNA. For the sake of brevity the tree in FIG. 2 is shown with five levels (L0 to L4), but range query data structures may typically have many more levels. As previously discussed, the tree 205 enables a structure traverser of a query processor to map a range of values (e.g., a starting index and an ending index in a suffix array) to another range of values (e.g., indexes to a document where the suffixes begin) shown as leaves in L4. In a typical range query data system, tree 205 may be stored in a memory. However, map function 200 is shown for illustrative purposes, but may not typically be stored in the memory.

The values in the root node (L0) bitmap represent the next node to be traversed in the tree. For example, at index position zero the root node contains a one, indicating that the traverser function should follow the right branch of the tree to L1. At index position one of the root node is a zero, indicating the left branch to L1 should be followed. To determine what index position to examine in the next node (in L1), the traverser function counts the zeros or ones that occur before the position being examined in the current node. For example, starting with the $r^{th}$ position in the root node, if the $r^{th}$ position contains a zero, the number of zeros preceding the $r^{th}$ position indicates where in the left node down the desired bit position is located. For example, index position 5 in the root contains a zero, and there are two zeros ahead of it in the root node. Therefore, in the next level down (L1), the system should look at the left hand node in index position 2. Index position 2 in L1 has a zero with no zeros ahead of it, meaning that the traverser function should go to the left hand node of the next level down (L2) and examine index position zero of the left node in L2. Index position zero in the node in L2 is a one, indicating that the traverser function should take the right branch to L3, and inspect index position zero (because there are no ones ahead of index position zero). Finally, index position zero in L3 is a zero, indicating the traverser function should go to the left leaf node in L4. The left leaf node in L4 is a "2" (e.g., representing the starting index position in a document for the string found at index position 5 of the suffix array), so the traverser function will return this value. In this manner, the traverser function traverses the tree to map index position 5 (the i value of 5) to a "2" (the j value).

A computing system may efficiently count of the number of ones or zeros ahead of the $r^{th}$ position using a bitrank structure. In some implementations, a bit-rank data structure includes the bitmap itself, a superblock rank array ($R_s$) and a series of sub-block ranks in an array ($R_b$). The rank refers to the number of ones or zeros occurring before a specified bit position. For example, in the bitmap 0101001011, the rank1 of index position 3 is 1 (because there is one 1 occurring before index position 3), while the rank0 of index position 3 is 2 (because there are two 0's occurring before index position 3). Because the value of rank0 can be derived from the value of rank1 (i.e., the index position minus the value of rank1), typically only the rank1 function is needed for a bit-rank map.

The bitmap of the bit-rank structure may be divided into superblocks, and each superblock may be divided into sub-blocks. The superblock rank array $R_s$ stores the absolute rank of each superblock (in one 4-byte unsigned integer for each superblock). The absolute rank is the number of ones (e.g., rank1) that occur in the superblocks before the current super-block. For example, if the bitmap is divided into 4 super-blocks, the array $R_s$ will include four values, $R_s[0]$ to $R_s[3]$. $R_s[0]$ contains the number of 1's occurring before the first superblock, which is zero because there are no superblocks before the first superblock. $R_s[1]$ contains the number of 1's occurring in the first superblock. $R_s[2]$ contains the number of 1's in the first and the second superblock, etc.

The sub-block rank $R_b$ includes, for each sub-block, a relative rank with respect to the superblock. As an example, if each superblock is divided into four sub-blocks, the bit-rank structure would include an array with four values for each superblock (i.e., $R_b[0]$ to $R_b[3]$ belong to the first superblock and $R_b[4]$ to $R_b[7]$ belong to the second superblock, etc.). Thus, in the second superblock, $R_b[4]$ is zero because it is the first sub-block in the second superblock, so no sub-blocks occur before it. $R_b[5]$ has the number of ones occurring in the first sub-block of the second superblock, $R_b[6]$ has the number of ones occurring in the first and second sub-blocks of the second superblock, etc. The rank1 for any particular bit in the bitmap can be calculated by adding the values of the appropriate entries of the $R_s$ and $R_b$ arrays to a calculation of the number of ones that occur prior to the position of the bit within the sub-block that contains the bit. In other words, the rank1 for bit i, when i occurs in the third sub-block of the second superblock is $R_s[1]+R_b[6]$+popcount for i within the sub-block that contains i (a popcount is a computer instruction that returns the number of bits that are set in a bit array. The bits occurring after the $i^{th}$ bit are zeroed before performing the popcount to reflect only the ones that occur before the $i^{th}$ bit). Bitrank structures are described in more detail in Mäkinen et al, "Rank and Select Revisited and Extended" and Gonzalez et al., "Practical Implementations of Rank and Select Queries".

Using a range query data structure more easily and quickly allows a range of i values to be converted to j values because at each level of the tree there is a range of values that fall to the left and a range to the right. For example, if the traverser function is asked to find the j values that correspond to index positions 6-8 in FIG. 2 (as shown by the dotted box around these positions in the root node), the traverser function will find that index positions 6 and 7 contain a '0', meaning these values will go to the left tree and index position 8 contains a '1' meaning this value will go to the right tree. In the root node, there are three zeros before index position 6, so the traverser function will look at index positions 3 and 4 of the left node in L1 (also shown with a dotted box in FIG. 2). In the root node, there are also three ones before index position 8, so the traverser function will look at index position 3 of the right node in L1, as shown in FIG. 2. The traverser function will continue to traverse the tree (in depth-first order) until the three leaf nodes are identified (e.g., the values 1, 5, and 15, as shown in FIG. 2). As each leaf node is identified it is reported out of the traverser function. Because the traverser function performs a depth-first search of the tree, the leaves will be identified in ascending order, and thus the traverser function will return the mapped j values in ascending order.

Because the non-leaf nodes of the tree are binary values, they can be represented by one bit. Thus, each level of the tree takes up the same number of bits as the previous level, with only one bit used per leaf node in each level. To ensure that leaves occur at the same level, in some implementations, the number of bits in each interior node may be thought of as being a power of 2 (e.g., 64, 128, 256, etc.), with any extra bits needed to bring the total number up to a power of 2 being non-zero values. In such implementations these extra bits may not be physically stored as part of the nodes in the tree, but may be used conceptually in building the tree to ensure that the leaf nodes occur at the same level. Disclosed implementations seek to improve the processing time required for a range query by eliminating the lower levels of the tree by cutting the tree at a level and replacing the nodes at the level with leaf nodes that contain the j values and using a brute-force lookup method and sorting procedure at the leaf node. Thus, the hybrid range query data structure eliminates the need to traverse the full range query data structure, while preserving the advantages of using the full structure.

Figure 1:
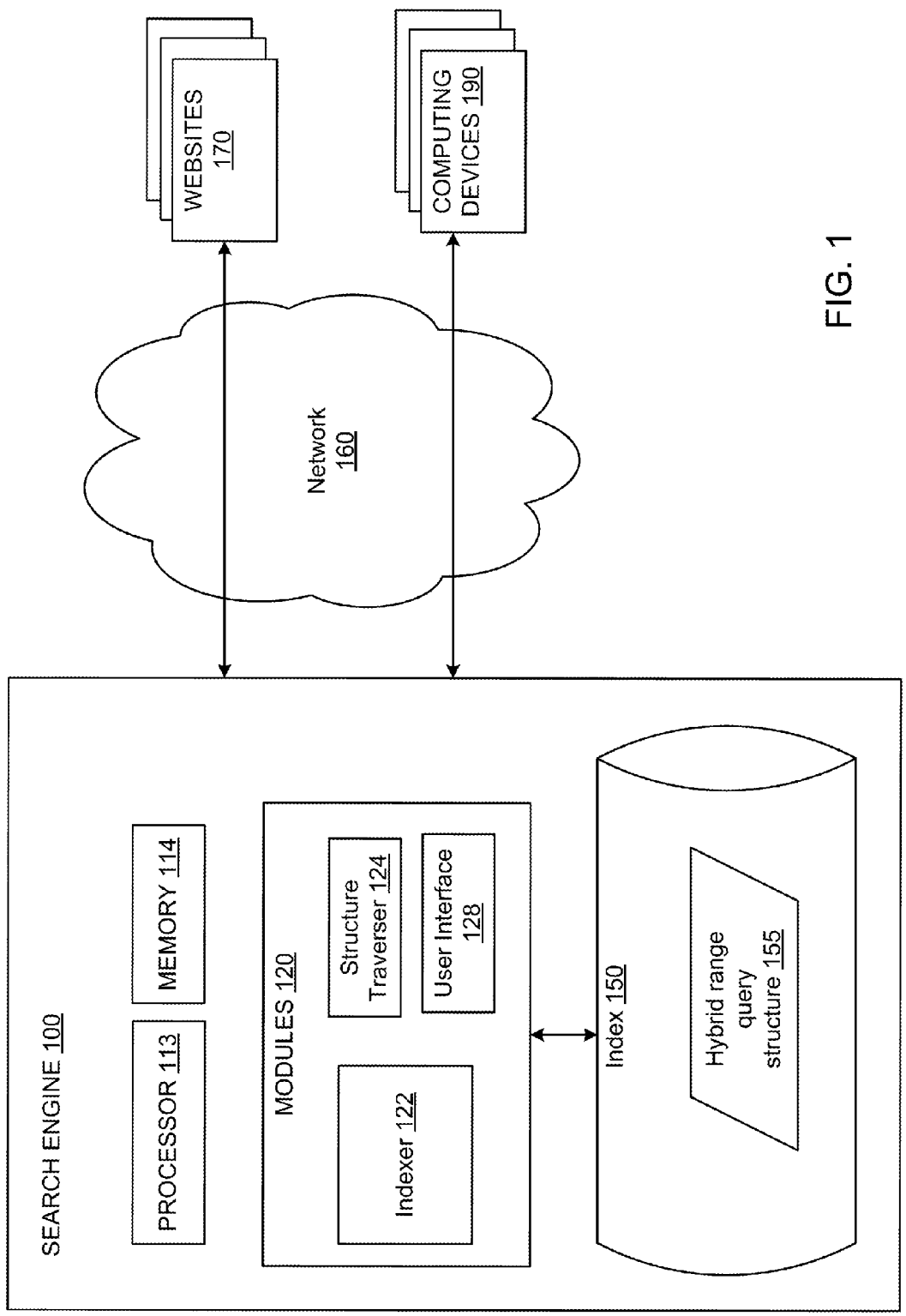
FIG. 1 illustrates an example system in accordance with the disclosed subject matter.

FIG. 1 is a block diagram of a search engine 100 in accordance with an example implementation. The search engine 100 may be used to implement the query techniques described herein. The depiction of search engine 100 in FIG. 1 is described as an Internet-based search engine with access to documents available through the Internet. Documents may include any type of file-based content, including web pages, PDF documents, word-processing documents, images, sound files, source code, JavaScript files, etc. But, it will be appreciated that the range query techniques described may be used in other configurations where the need to perform range queries arises. For example, the search engine may be used to search local documents, or documents available through other technologies, or the search engine may be used in research applications indexing DNA sequences, pattern recognition, etc.

Figure 7:
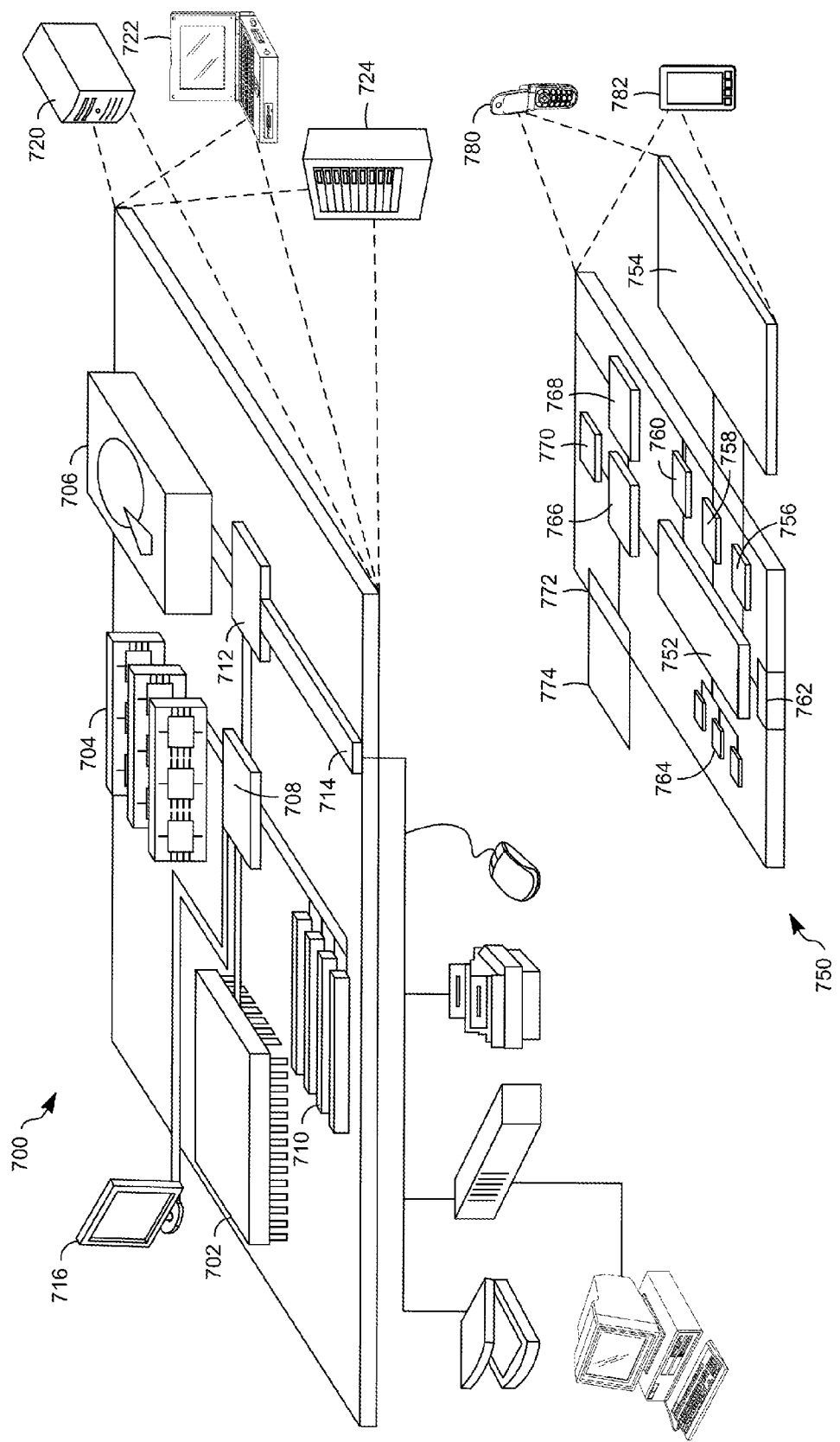
FIG. 7 shows an example of a computer device that can be used to implement the described techniques.

The search engine 100 may be a computing device that takes the form of a number of different devices, for example, a standard server, a group of such servers, or a rack server system. In some implementations, search engine 100 may be implemented in a personal computer, for example a laptop computer. The search engine 100 may be an example of computer device 700, as depicted in FIG. 7.

Search engine 100 can include one or more processors 113 configured to execute one or more machine executable instructions or pieces of software, firmware, or a combination thereof. The search engine 100 can include, an operating system (not shown) and one or more computer memories 114, for example a main memory, configured to store one or more pieces of data, either temporarily, permanently, semi-permanently, or a combination thereof. The memory 114 may include any type of storage device that stores information in a format that can be read and/or executed by processor 113. Memory 114 may include volatile memory, non-volatile memory, or a combination thereof. In some implementations memory 114 may store modules, for example modules 120. In some implementations modules 120 may be stored in an external storage device (not shown) and loaded into memory 114. The modules 120, when executed by processor 113, may cause processor 113 to perform certain operations.

For example, modules 120 may include an indexer 122 that enables search engine 100 to create a search index that includes a hybrid binary tree based on documents crawled from websites 170. Websites 170 may be any type of computing device accessible over the Internet. In some implementations, websites 170 may represent any type of memory storing documents. Indexer 122 may parse the documents fetched by a document crawler to create a search index 150. As part of the search index 150, indexer module 122 may create hybrid range query structure 155. In some implementations, index 150 may be stored in memory 114, for example in main memory or in disk memory. In some implementations (not shown) the search index 150 and hybrid range query data structure 155 may be stored in a memory device external to search engine 100.

Search engine 100 may use the hybrid range query structure 155 to respond to queries and return search results. For example, as part of determining search results for a query, modules 120 may include a query processor module (not shown) that enables search engine 100 to consult a suffix array, determine a range of values and traverse the hybrid binary tree of the range query data structure 155 to return the values that map to the determined range. The structure traverser module 124 may be part of the query processor module, which generates a result list in response to a query received from one of computing devices 190. Computing devices 190 may be any type of computing device in communication with search engine 100 over network 160. For example, computing devices 190 may include desktops, laptops, tablet computers, mobile phones, smart phones, or a television with at least one or more processors. User interface module 128 may provide a user interface to the user of computing device 190 that allows the user to access the search engine 100.

Search engine 100 may be in communication with the websites 170 and computing devices 190 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the search engine 100 may communicate with and transmit data from websites 170 and computing devices 190.

The search system 100 of FIG. 1 operates over a corpus of documents, for example the Internet and World Wide Web, but can likewise be used in more limited collections, for example a library of a private enterprise. Such a library may store, for example, DNA sequences or internal documents. In either context, documents can be distributed across many different computer systems and sites (e.g., websites 170) and the hybrid range query structure 155 may be used in any application where range queries are used.

Figure 3:
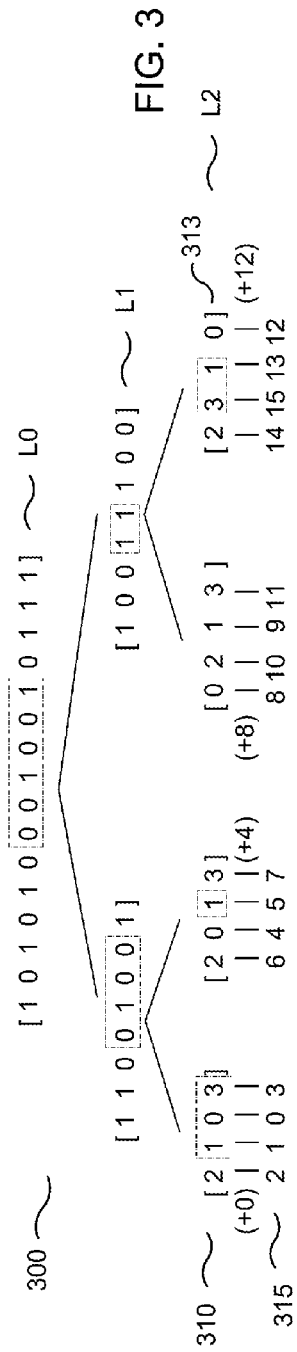
FIG. 3 illustrates a binary tree for a hybrid range query data structure, in accordance with disclosed implementations.

FIG. 3 illustrates a hybrid range query data structure, in accordance with disclosed embodiments. The hybrid tree of FIG. 3 eliminates the two lowest levels of the tree of FIG. 2. For ease of explanation, the tree of FIG. 3 shows eliminating two levels of the tree, but implementations may eliminate any number of layers. In some implementations eliminating at least six levels results in noticeable performance increases because the time required to sort the values of the leaf nodes in the hybrid tree becomes far less than the time required to complete the search of the lower levels of the tree. The number of layers eliminated by the indexer 122 depends on system performance considerations and the size of the tree. For example, replacing the last 8 layers of the tree enables each leaf value to fit in 1 byte (8 bits), keeping the values of leaf nodes within one cache line during the sort (as explained below with regard to FIG. 5), which further reduces the processing time of the tree traversal. With a larger cache line, more levels (e.g., 16) may be replaced while still falling within the cache line, although more levels may be replaced even if the leaf values do not fall within a cache line.

In some implementations, to conserve memory and improve response time, the values of the leaf nodes may be stored in a manner that allows their values to be calculated based on the number of the leaf node. For example, in FIG. 3 where two levels have been eliminated, each leaf node at L2 contains four values, thus two bits would be needed to represent values ranging from 0-3. In an implementation with six levels eliminated, each leaf node will have up to 64 values and each leaf node value can be represented by 6 bits. In an implementation with eight levels eliminated, each leaf node will have up to 256 values and each leaf node value can be represented by 8 bits. Thus, as each level of the tree is eliminated, the number of values in each leaf node may be represented by up to $2^k$ where k is the number of levels eliminated and each value can be represented by k bits.

Returning to the example of FIG. 3, in the first node (node 0), the values 0-3 map directly to actual values 0-3, as shown in FIG. 3. In the second leaf node (node 1), the values 0-3 map to actual values 4-7, and in node 3, the values 0-3 map to actual values 8-11, etc. The mapping of the leaf values to actual values may be represented by the equation $v+(n*2^k)$ or some similar equation where v=the value in the leaf node, n=the leaf node number (starting with zero) and $2^k$=the number of levels eliminated. Thus, in the example of FIG. 3, the value 3 in the fourth node (node number 3) maps to the actual value of 15 ($3+(3*2^2)$). Using the leaf node number to calculate the actual values allows the hybrid tree to use fewer bits in each leaf node while storing the same data. The ($n*2^k$) portion of the equation may be referred to as the node offset and may be added to the value of the node to determine the actual value represented by the value in the leaf node. In FIG. 3 the node offsets for each node are shown by the (+0), (+4), (+8), and (+12) notations. The actual j values 315 of FIG. 3 represent the values stored in the leaf nodes added to the appropriate node offset.

In some implementations, the nodes in each layer of the hybrid range query data structure may be stored in a single bitrank data structure. In such an implementation the nodes are implicitly represented by knowing the depth of the node and its starting bit, which can be computed during traversal of the structure.

Figure 4:
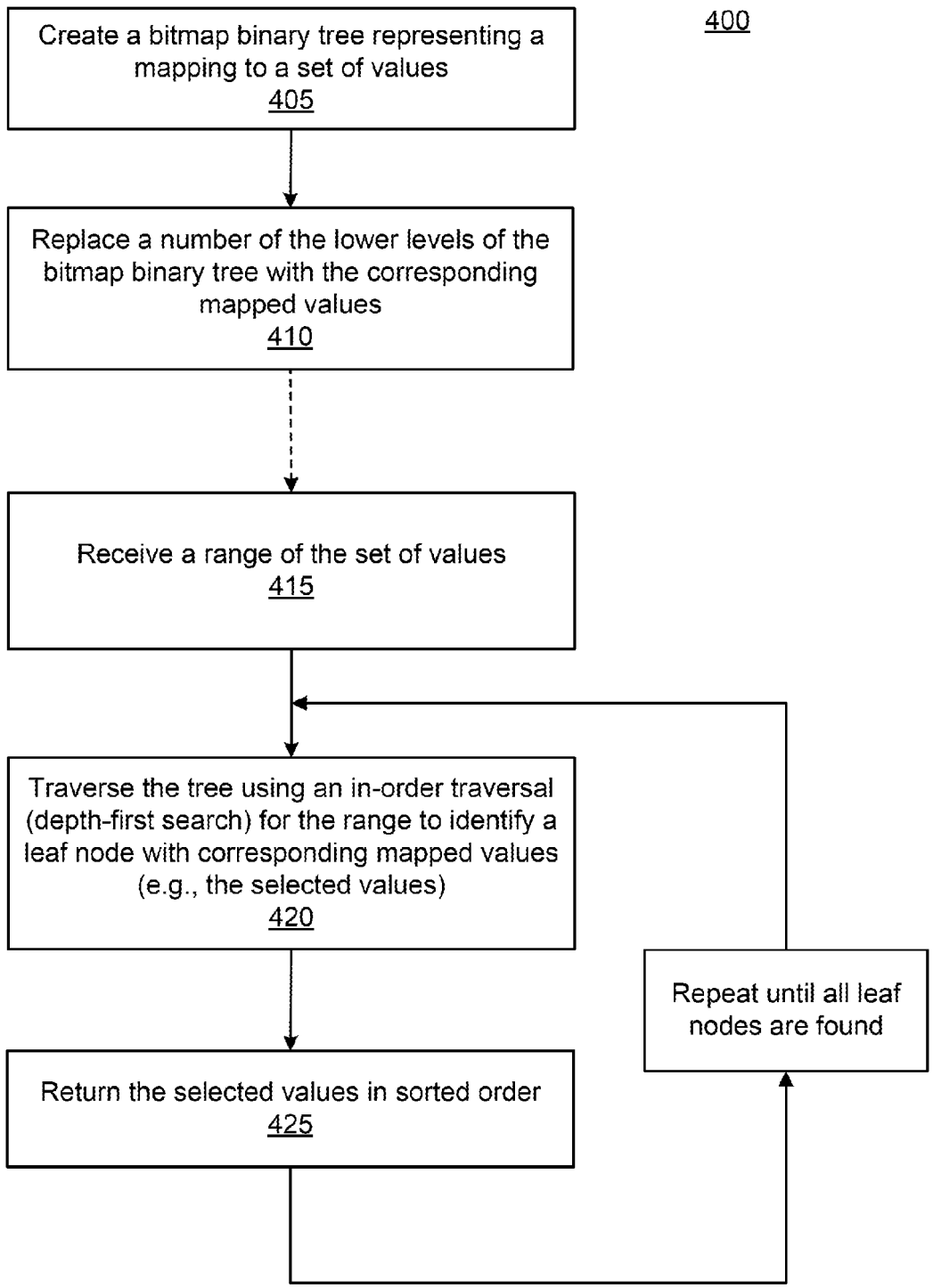
FIG. 4 is a flow diagram illustrating a process for creating and traversing a hybrid range query data structure, in accordance with disclosed implementations.

FIG. 4 is a flow diagram illustrating a process 400 for creating and traversing a hybrid range query data structure, in accordance with disclosed embodiments. Process 400 shown in FIG. 4 may be performed by an indexer (e.g., indexer 122 shown in FIG. 1) and a query processor (e.g., one that may include traverser module 124 shown in FIG. 1). Process 400 may begin with the indexer 122 creating a range query data structure that includes a bitmap binary tree for mapping one set of values to another set of values (step 405). Such a tree may be created using the process described in Mäkinen et al., "Position-Restricted Substring Searching," 2006, which is incorporated by reference. For example, in a document search engine, the indexer 122 may create a suffix index of a particular document. As part of the creation of the suffix index, the document search engine may map the entry at each index position in the suffix array to an index position in the document, so that the indexer knows where each suffix is located in the document. Mapping 200 of FIG. 2 shows an example of a mapping. In the Map 200, index position 1 of the suffix array maps to 6, which represents the index position in the document where the suffix begins, and so on. While the actual map 200 could be stored in memory, it is a poor structure for determining the answer to range queries where the mapped values need to be sorted and uses too much memory for large indices storing many documents (e.g., for indexes containing millions of entries). For example, if the map 200 is stored as a simple integer array, each entry consumes at least 32 bits making the size (n*32), which far exceeds the size of a range query data structure, which is log(n)*(1+~20%) where the ~20% overhead comes from the bitrank data structure. Moreover, to sort the j values of the integer array in map 200 requires an array of length m (the range size). When m is large, the memory overhead becomes significant. In addition to being more memory conscious than the brute-force method, disclosed implementations increase the memory efficiency of traditional range query data structures by saving some of the memory needed to store the data structure. For example, with 8 layers eliminated, a hybrid range query data structure saves 8*20%*n, or 1.6*n bits over traditional range query data structures.

Therefore to take advantage of the hybrid range query data structure, the indexer 122 may begin to create the range query tree shown in FIG. 2. When building the range query tree, the indexer 122 may eliminate a number of the lower levels of the tree (step 410). In one implementation, indexer 122 may stop building the tree at a certain point, such as when the number of bits in a node equal a pre-specified number, and create leaf nodes rather than continue building the lower levels of the tree. In such a manner, indexer 122 creates the hybrid range query structure 155. For example, as shown in FIG. 3, when the indexer 122 gets to Level 2 (L2) of the range query tree it may create leaf nodes that contain the mapped values rather than the ones and zeros that indicate how to further traverse the tree. In some implementations, indexer 122 may perform steps 405 and 410 once for each document indexed and may store the hybrid tree as part of the index entry for the document. In other implementations, documents may be concatenated into a huge meta-document and the indexer 122 may perform steps 405 and 410 for the meta-document. In some such implementations, the system may include more than one meta-document, depending on the memory resources and the size of the document repository.

At a later point in time (shown by the dashed line of FIG. 4) a user may submit a query to the search engine 100. As part of the query search process traverser module 124 may receive a range of values, for example from a suffix array, that need to be mapped to corresponding values (step 415). Using the example of FIG. 3, the range may be 6-11 (in zero-based indexing), as shown by the dotted box around index positions 6-11 of the root node in L0. Traverser module 124 may traverse the tree using a depth-first traversal, or a depth-first search. In a depth-first search, the traverser module 124 begins at the root and explores as far as possible (down to a leaf node) on each branch before backtracking. In such a traversal, the leaf nodes will be reached one at a time and in-order from left to right.

Using the depth-first traversal, traversal module 124 may traverse the tree to identify a leaf node with at least one corresponding mapped value (step 420). Using the example of FIG. 3, the values of root node indicate that four values will be found in the left branch of L1, starting at index position 3 and two values will be found at the right branch of L1 starting in index position 3. These values are shown in the dotted boxes of the left and right branches of L1. Because traverser module 124 is using a depth-first traversal, the left branch is consulted first. The values shown in the dotted box at L1 of FIG. 3 indicate that three values will be found in the left branch of L2 starting at index position 1 and one value will be found in the right branch starting at index position 2. At the left-child in L2, traverser module 124 finds the leaf node. Thus, traverser module 124 has identified a leaf node with corresponding values in bit positions 1-3. These corresponding mapped values in the array of the leaf node may be referred to herein as selected values. The traverser module 124 will then return the selected values in sorted order (step 430). Traverser module 124 will repeat steps 420 to 430 until all leaf nodes with corresponding values are identified. Process 400 then ends, with all mapped values having been returned to the query processing module in sorted order for further processing.

Figure 5:
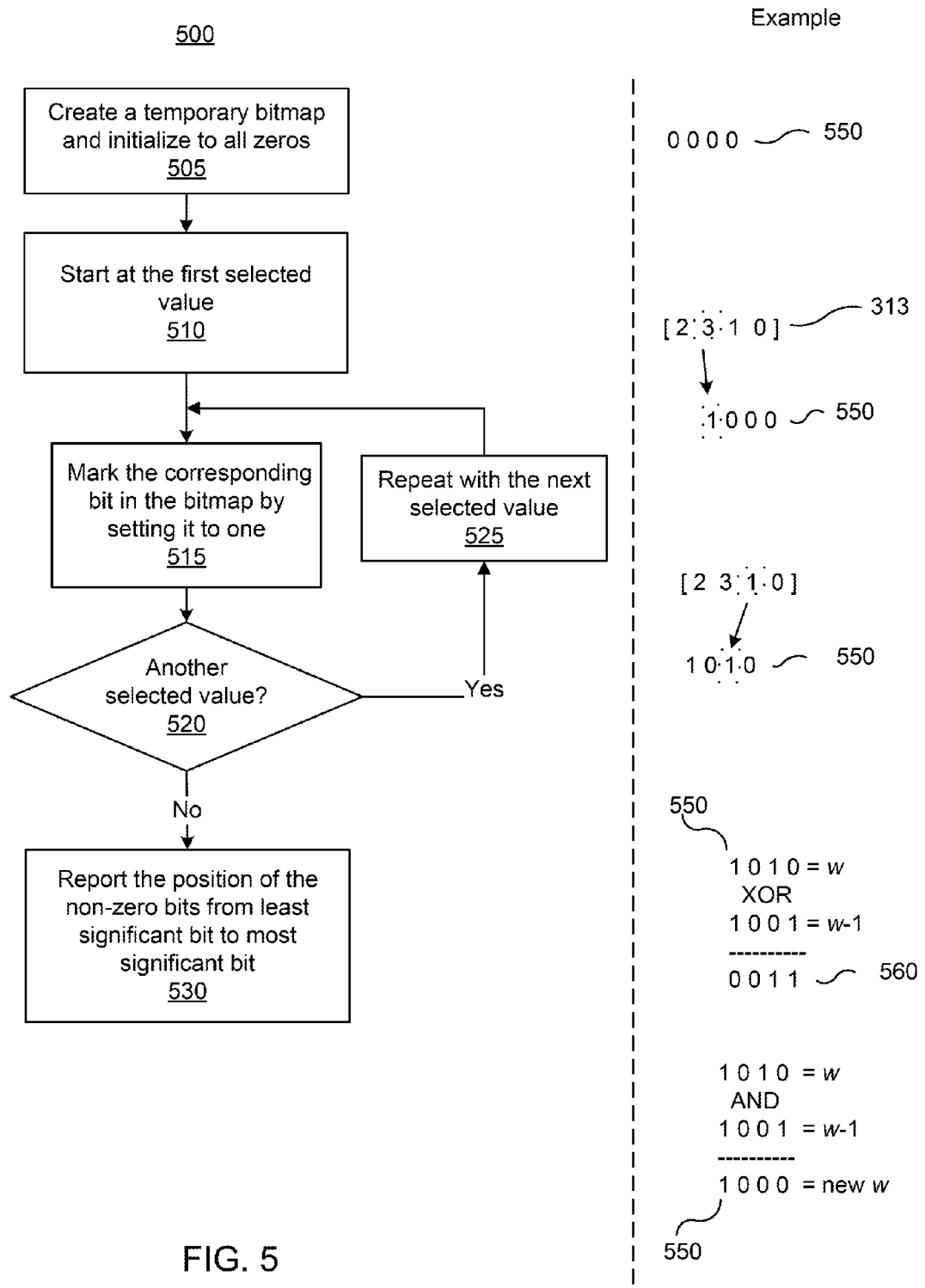
FIG. 5 is a flow diagram illustrating a process for marking the corresponding mapped values and returning the marked values in sorted order, in accordance with disclosed implementations.

FIG. 5 is a flow diagram illustrating a process 500 for marking the corresponding mapped values and returning the marked values in sorted order in accordance with disclosed implementations. The traverser module 124 may use process 500 as part of step 425 in process 400. Although implementations may use any known sorting process to return the leaf values in sorted order, in some implementations traverser module 124 may take advantage of sorting process 500, which takes advantage of the structure of the hybrid tree, for memory efficiency and improved query response time.

In process 500, when traverser module 124 identifies a leaf node with corresponding mapped values, it may create a temporary bitmap and initialize the bitmap to all zeros (step 505). In some implementations the size of the temporary bitmap may be the size of each leaf node. In the example of FIG. 3, each leaf node has four values, so the temporary bitmap may have four bits (one bit for each value in the leaf node). The traverser module 124 may then start with the first selected value (step 510) and set the corresponding bit in the bitmap to a non-zero value (step 515). For example, the traverser module 124 may identify node 313 of FIG. 3 as containing selected values in index positions 1 and 2 (node 313 of FIG. 3 is reproduced in the example of FIG. 5 for convenience). The value of index position 1 is a three, which indicates that traverser module 124 should set the most significant bit (the fourth bit) in the bitmask 550 to a non-zero value, as shown in FIG. 5. Because in computer-processing most arrays use a zero-based index (meaning that reference to the index positions begin with zero and not with one), the value '3' represents the highest index position in an array of 4 values. Also, because the bitmask 500 is interpreted as a word on which traverser module 124 performs arithmetic and bit operations, the bit considered "most significant" depends on the configuration of system 100.

The traverser module 124 may then check for another selected value. If there is another selected value (step 520, Yes), the traverser module 124 looks at the next selected value (e.g., in index position 2 in the example of FIG. 5). The value at this position is a one, indicating that the traverser module 124 should set the second least significant bit in the bitmask 550, as shown in FIG. 5. The bitmask 550 now contains [1 0 1 0]. No other selected values exist (step 520 no), so the traverser module 124 may report the index positions of the selected values in bitmask 550 from the least significant bit to the most significant bit (step 530). In some implementations, the traverser module 124 may set and report the positions from the most significant bit to the least significant bit, or in some other order, depending on the configuration of system 100. In some implementations, when reporting the bits, the traverser module may need to account for the node offset. For example, leaf node 313 contains the values [2 3 1 0] which map to the actual values of [14 15 13 12]. As explained above, the node offset may be calculated by multiplying the node number (in this example, node 313 is the fourth node, which means the node number is 3 because of zero-based indexing) by the number of values in each leaf node (in this example, this is four). Thus, the node offset for this node is 12 (3 times 4). Adding the node offset of 12 to each of the values in node 313 produces the actual values.

To report the position of the non-zero bits from least significant to most significant (step 530), the traverser module may take the value of the bitmap 550 (e.g., w), subtract one from the value of the bitmap (e.g., w−1) and perform an XOR operation on the two values (e.g., w XOR w−1). Performing this operation results in a bitmask 560 with ones in every position up to the position of the least significant non-zero bit and zeros in every other position. In the example of FIG. 5, the bitmask 560 contains two set bits (i.e., non-zero bits). This indicates that the bit in the second position was the least significant set bit. In some implementations the traverser module 124 may perform a popcount on the bitmask 560 to determine the number of bits set. A popcount is a computer instruction that returns the number of bits that are set in a bit array. In the example of FIG. 5 the XOR operation results in a bit stream of 0011, so the popcount returns a 2. In implementations that use zero-based indexing, the traverser module 124 may subtract one from this popcount value to represent the index position (with zero being the first index position). To return the actual value associated with this bit, the traverser module 124 may also add the node offset to it, resulting in the actual mapped value for the least significant set bit in bitmap 550. In the example of FIG. 5, the returned value is a 13 (which corresponds to the i value in the eleventh index position of map 200, which was the last i value in the range selected in FIG. 3).

To report the next least significant set bit of the leaf node, traverser module 124 must clear the bit just reported from the bitmask 550. This may be done using an AND operation. For example, the traverser module 124 may perform the AND operation between the bitmap 550(w) and the value of the bitmap 550 minus 1 (w−1), which results in a new bitmap 550(w), as shown in the example of FIG. 5. Traverser module 124 may then repeat the XOR operation as described above to report the value of the next most significant position. When the bitmap 550(w) has no non-zero bits, the reporting process may be complete for that leaf node.

FIG. 6 illustrates an example of pseudo-code to implement the reporting of the position of the selected values from the least significant bit to the most significant bit in implementations where the number of layers eliminated from the range query data structure is 6 or more. In implementations where the number of levels eliminated is 6 or more (e.g., k>=6), the temporary bitmap may have a length of $2^k$, where k is the number of levels eliminated. The temporary bitmap may be divided into sections that are the length of a word, which is typically 64 bits, although other word sizes are possible. For example, if 8 layers of a tree are eliminated in creating the hybrid tree, the temporary bitmap may be 256 bits divided into four 64-bit sections (e.g., words). After they have been set, the marked bits in each 64-bit word may be reported in order. As discussed above, the traverser module 124 may need to add the values reported from the pseudo-code example of FIG. 6 to the node offset (the node number multiplied by the number of values in the node) to obtain the actual mapped value. Moreover, the example shown in FIG. 6 illustrates a 64-bit word implementation, although a similar sort may be used for 128-bit word or 32-bit word, etc., with appropriate modifications.

Although the examples discussed above have shown permutations (e.g., an equal number of source and target values), disclosed embodiments are not limited to permutations. In implementations where the target values (the j values) are fewer than the source values (the i values) then the hybrid range query data structure may have fewer levels. For example, if the number of target values is x, the size may be log(x) rather than log(n). However, if the number of target values is greater than the source values, the system may need to perform some additional operations after returning the selected values in sorted order. For example, the system may use a bitrank structure or a look-up table to increase the values.

FIG. 7 shows an example of a generic computer device 700 and a generic mobile computer device 750, which may be used with the techniques described here. Computing device 700 is intended to represent various forms of digital computers, e.g., laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, for example, display 716 coupled to high speed interface 708. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, for example, a magnetic or optical disk.

The storage device 706 is capable of providing mass storage for the computing device 700. In one implementation, the storage device 706 may be or contain a computer-readable medium, for example, a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, for example, the memory 704, the storage device 706, or memory on processor 702.

The high speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, for example, a keyboard, a pointing device, a scanner, or a networking device, for example a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer like laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" and "computer-readable storage device" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   generating, by a processor, a first level comprising a root node and lower levels below the first level comprising intermediate nodes of a hybrid range query data structure, the data structure representing a bitmap binary tree mapping a first set of values to a second set of values;
   determining, during the generating, that a quantity of bits in a next intermediate node in the bitmap binary tree is equal to a pre-specified number;
   generating, responsive to the determining, leaf nodes for the hybrid range query data structure instead of generating additional lower levels thereby eliminating lower levels, the leaf nodes storing values corresponding to the second set of values, wherein each leaf node has an associated node offset and no two values in a leaf node are equal;
   storing the hybrid range query data structure in a memory; and
   returning, in response to a range query including a range of first values in the first set of values, values in the second set of values determined from summation of values in leaf nodes that correspond to respective first values in the range of first values and respective node offsets.

2. The method of claim 1, wherein the pre-specified number is eight.

3. The method of claim 1, wherein the first set of values are positions in a suffix array and the second set of values represent positions within a document.

4. The method of claim 1, wherein returning the values in the second set of values includes:
   receiving the range of first values;
   using the range of first values to traverse the data structure in an depth-first traversal to identify leaf nodes having values that correspond to the first values; and
   returning the values in the second set of values in sorted order.

5. The method of claim 4, wherein returning the values in the second set of values in sorted order includes:
   arriving at a particular leaf node of the leaf nodes, the particular leaf node containing at least some values mapping to at least some of the first values;
   marking bits in a bitmap corresponding to the at least some values in the particular leaf node; and
   reporting the sum based on a position of the marked bits.

6. The method of claim 5, wherein the bitmap is divided into sections that match a word size.

7. The method of claim 1, wherein the node offset for a particular leaf node is calculated based on a quantity of values in the particular leaf node.

8. A system for processing range queries comprising:
   at least one processor; and
   at least one memory storing a hybrid range query data structure and storing instructions that, when executed by the processor, cause the processor to create and use the data structure, the hybrid range query data structure comprising:
      a first level including a root node of a binary tree, wherein the root node includes a bitmap that includes one bit for each value in a set of first values,
      lower levels below the first level comprising non-leaf nodes of the binary tree, wherein each non-leaf node has a parent node and one or two child nodes and includes a bitmap, wherein the number of bits in bitmaps of non-leaf nodes sharing a particular parent node equal the number of bits in the bitmap of the particular parent node, and leaf nodes of the binary tree, wherein:
- each leaf node has a non-leaf parent node,
- each leaf node includes an associated node offset and four or more second values, wherein a sum of the associated node offset and a respective value of the second values maps to one value in the first set of values and no two second values in a leaf node are equal,
- the number of second values in leaf nodes sharing a particular non-leaf parent node equals the number of bits in the bitmap of the particular non-leaf parent node, and
- each leaf node is generated upon determining, while generating the hybrid range data structure, that a quantity of bits in a next intermediate node in the binary tree is equal to a pre-specified number, the instructions further including instructions that cause the system to return, in response to a range query including a range of first values in the first set of values, values in the second set of values determined from the sum of values in leaf nodes that corresponds to respective first values in the range of first values and respective node offsets.

9. The system of claim 8, wherein the leaf nodes eliminate a quantity of successive lower levels of a full binary tree and the number of second values in each leaf node is based on the quantity of lower levels eliminated.

10. The system of claim 8, wherein the leaf nodes eliminate a quantity of successive lower levels in a full binary tree and each second value is stored in a number of bits, the number of bits being equal to the quantity of lower levels eliminated.

11. The system of claim 8, wherein returning the values in the second set of values includes:
- receiving the range of first values;
- using the range of first values to traverse the binary tree in an depth-first traversal to identify leaf nodes having values that correspond to the first values; and
- returning the values in the second set of values in sorted order.

12. The system of claim 11, wherein returning the values in the second set of values in sorted order includes:
- arriving at a particular leaf node of the leaf nodes, the particular leaf node containing at least some values that correspond to the first values;
- marking bits in a bitmap corresponding to the at least some values in the particular leaf node; and
- reporting the sum based on a position of the marked bits.

13. The system of claim 12, wherein the marked bits are reported from least significant bit to most significant bit.

14. The system of claim 12, wherein the bitmap is divided into sections that match a word size.

15. A non-transitory computer-readable storage device for creating and using a hybrid range query data structure, the storage device having recorded and embodied thereon instructions that, when executed by one or more processors of a computer system, cause the computer system to:
- generate a first level comprising a root node and lower levels below the first level comprising intermediate nodes of the hybrid range query data structure, the data structure representing a bitmap binary tree used to map a first set of values to a second set of values;
- determining, during the generating, that a quantity of bits in a next intermediate node in the bitmap binary tree is equal to a pre-specified number;
- generate, responsive to the determining, leaf nodes for the hybrid range query data structure instead of generating additional lower levels thereby eliminating lower levels, the leaf nodes storing two or more values corresponding the second set of values, wherein no two values in a leaf node are equal and each leaf node has an associated node offset;
- store the data structure in a memory of the computer system; and
- return, in response to a range query including a range of first values in the first set of values, values in the second set of values determined from summation of values in the leaf nodes that correspond to the respective first values in the range of first values and respective node offsets.

16. The storage device of claim 15, wherein the instructions further cause the computer system to:
- receive the range of first values;
- use the range of first values to traverse the data structure in an depth-first traversal to identify leaf nodes having values that correspond to the first values; and
- return the values in the second values in sorted order.

17. The storage device of claim 16, wherein as part of returning the second values in sorted order, the instructions further cause the computer system to:
- arrive at a particular leaf node of the leaf nodes, the particular leaf node containing at least some values that correspond to the first values;
- mark bits in a bitmap corresponding to the at least some values in the particular leaf node; and
- reporting the sum based on of a position of the marked bits.

18. The storage device of claim 17, wherein the marked bits are reported from least significant bit to most significant bit.

19. The storage device of claim 17, wherein the bitmap is divided into sections that match a word size.

20. The storage device of claim 15, wherein the node offset for a particular leaf node is calculated based on a quantity of values in the particular leaf node.

* * * * *

UNITED STATES PATENT AND TRADEMARK OFFICE
CERTIFICATE OF CORRECTION

PATENT NO. : 8,856,138 B1
APPLICATION NO. : 13/570761
DATED : October 7, 2014
INVENTOR(S) : Alexander Neubeck Page 1 of 1

It is certified that error appears in the above-identified patent and that said Letters Patent is hereby corrected as shown below:

On the Title page, in item (56), in column 2, under "Other Publications", line 1, delete "Binmaps:" and insert -- Bitmaps: --, therefor.

IN THE CLAIMS:

In column 18, line 43, in claim 17, after "on" delete "of".

Signed and Sealed this
Tenth Day of February, 2015

Michelle K. Lee
*Deputy Director of the United States Patent and Trademark Office*